June 9, 1953     E. KLEPETKO, JR     2,641,142
POWER TRANSMISSION

Filed Feb. 20, 1951     2 Sheets-Sheet 1

INVENTOR.
*Ernest Klepetko Jr.*

BY

ATTORNEYS

June 9, 1953 E. KLEPETKO, JR 2,641,142
POWER TRANSMISSION
Filed Feb. 20, 1951 2 Sheets-Sheet 2
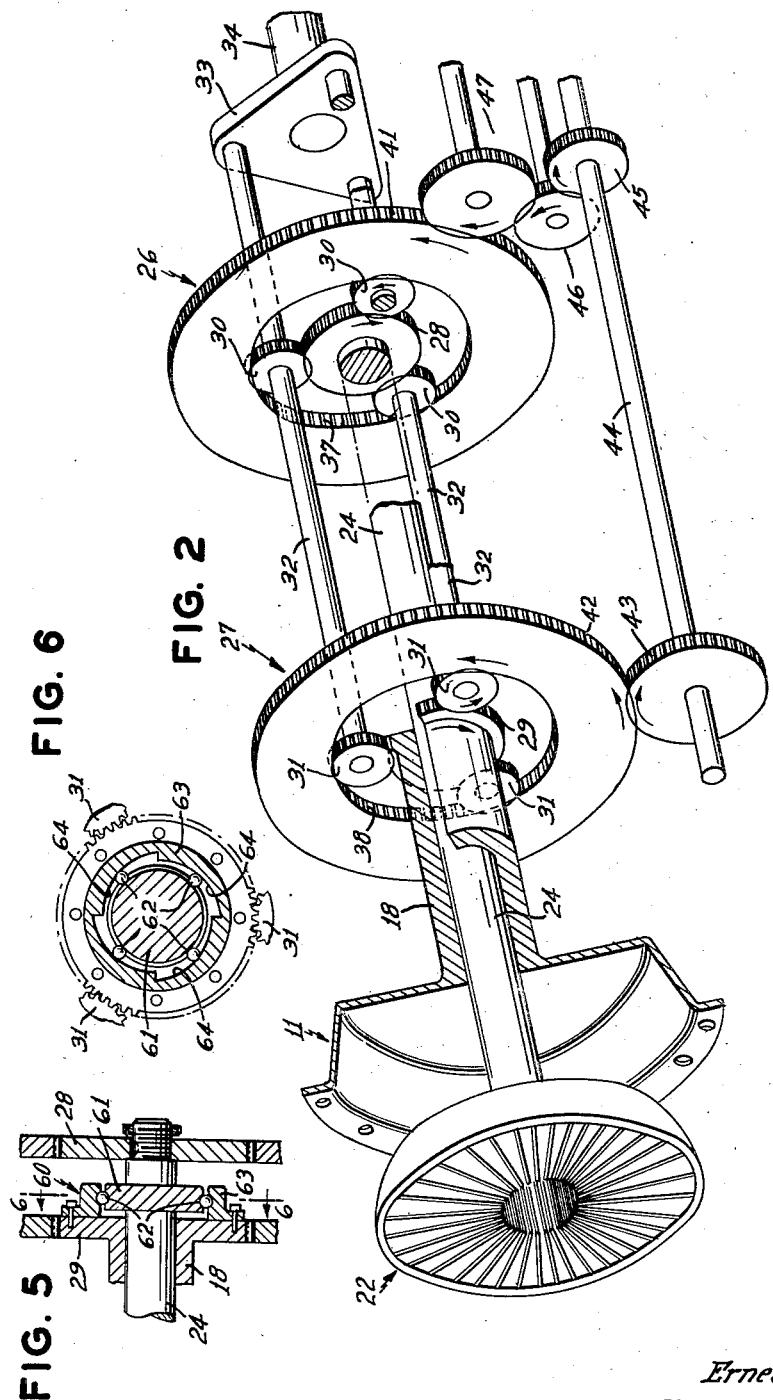
INVENTOR.
Ernest Klepetko Jr.
BY
ATTORNEYS Patented June 9, 1953

2,641,142

UNITED STATES PATENT OFFICE 2,641,142

POWER TRANSMISSION

Ernest Klepetko, Jr., Aruba, Curacao,
Netherlands West Indies

Application February 20, 1951, Serial No. 211,844

12 Claims. (Cl. 74—688)

This invention relates to power transmission mechanisms, and is particularly directed to an improved power transmission in which the speed of the output shaft varies automatically with variations in the magnitude of the load. The power transmission mechanism of this invention is especially well suited for use as an automatic transmission in automobiles, but it can be used with advantage for other purposes as well. For example, it is well suited for transmitting power from a constant speed motor or engine to a variable load which should be driven at a speed inversely related to its magnitude, e. g. a roll on which a web of paper is being wound at constant linear velocity but at a rotational velocity which decreases as the diameter of the roll increases.

The new power transmission comprises a slippable coupling having driving and driven members, and an output shaft. The output shaft is connected to the coupling by means of epicyclic gearing comprising first and second epicyclic gear elements secured respectively to the driven and driving members of the coupling, and a third epicyclic gear element secured to the output shaft and engaging said first and second elements. Gear means are provided for interconnecting said first and second gear elements through said third gear element, thereby limiting the extent of relative rotation that may occur between the driving and driven members of the slippable coupling.

In one especially advantageous form of the new transmission, a fluid coupling is employed as the slippable coupling, and primary and secondary epicyclic gear trains are connected respectively to its driven and driving members. Specifically, the sun gear of the primary epicyclic train is connected to the driven member of the fluid coupling, and the sun gear of the secondary epicyclic train is connected to the driving member of said coupling. A planet carrier is mounted on the output shaft; and to this carrier is secured a planet gear shaft on which primary and secondary planet gears, engaging respectively the primary and secondary sun gears, are mounted. The planet gears are free to rotate about their axes independently of each other, and they may rotate together in their respective orbits about the sun gears, but they are restrained by the common shaft on which they are mounted from independent orbital rotation about the sun gears. Primary and secondary ring gears, engaging respectively the primary and secondary planet gears, complete the primary and secondary epicyclic gear trains. An auxiliary gear drive comprising a driving gear driven by the secondary ring gear and a driven gear connected in driving relation with the primary ring gear connects the two epicyclic gear trains together. The gears of this auxiliary drive have ratios such that rotation of the secondary ring gear causes rotation of the primary ring gear in the same direction but at a slower speed. The effect of the auxiliary drive is to limit the extent of relative rotation, i. e. slip, that can occur between the driving and driven members of the fluid coupling. Feed back of motion from the primary ring gear to the secondary ring gear may be prevented, if necessary, by employing a worm and worm gear combination as the driving gear of the auxiliary drive.

It is advantageous in some embodiments of the invention to interpose a unidirectional coupling between the primary and secondary epicyclic trains, or between the driving and driven members of the fluid or equivalent slippable coupling, so as to permit the output shaft (or the driven member of such coupling) to rotate in one direction relative to the driving member of the coupling throughout a range of speeds, but to prevent the output shaft (or the driven member of said coupling) from rotating in the reverse direction relative to said driving member at any speed other than that determined by the ratio of the gearing. This arrangement is of value, for example, when the transmission is used in an automobile, so that when the vehicle is being driven by its engine the automatically variable speed characteristics of the transmission are fully available, but so that when the vehicle is coasting the full braking effect of the engine can be utilized.

An advantageous and presently preferred embodiment of the new power transmission, and some of its possible modifications, are described below with reference to the accompanying drawings, in which Fig. 1 is a longitudinal section through a power transmission mechanism according to the invention;

Fig. 2 is an exploded view in perspective of the gearing employed in the transmission shown in Fig. 1;

Fig. 5 is a longitudinal section through the sun gear elements of the new transmission, showing a modification in which a unidirectional coupling is employed; and Fig. 6 is a transverse section taken substantially along the line 6—6 of Fig. 5.

Figure 1:
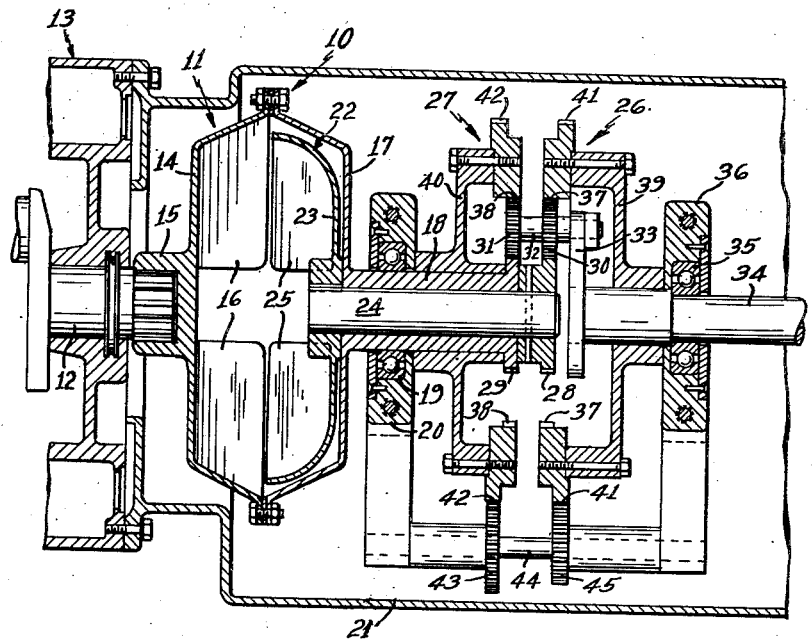

The new transmission as shown in Fig. 1 comprises a fluid coupling 10 having a driving member 11 connected to the crankshaft 12 of an internal combustion engine indicated at 13. The driving member, or impeller, 11 of the fluid coupling comprises a front casing 14 carrying a shaft coupling element 15 by which it may be splined (as shown) or otherwise connected to the engine crankshaft. Impeller (or pump) blades 16 are fixedly mounted in the casing 14. The front casing 14 is rigidly joined to a rear casing 17 which is attached to a hollow shaft 18 coaxial with the shaft coupling element 15, and which is supported in a bearing 19 mounted in a frame member 20 secured to the transmission housing 21. A driven member, or runner, 22 mounted within the casing 17 completes the fluid coupling. This driven member comprises a supporting frame 23 keyed to and supported by a shaft 24 extending through and journalled in the hollow shaft 18. Driven member (or runner) blades 25 are rigidly mounted in the frame 23.

The front and rear casings 14 and 17 together form an enclosure which normally is filled with an oil or other fluid. The driving member of the fluid coupling, comprising the casing 14 and blades 16, is driven at engine speed, as are the casing 17 and the hollow shaft 18 which are rigidly connected to it. The driven element of the coupling (comprising the supporting frame 23 and with its blades 25 and the shaft 24), being free from any positive connection to the driving member, is rotated only by the force transmitted to its blades 25 through the oil or other fluid filling the fluid coupling. Under conditions approximating no load on the driven member, it will rotate substantially at engine speed; but when a load is applied to the driven member shaft 24, it will rotate more slowly than the engine and the driving member 11, i. e., slippage will occur in the coupling. The extent to which such slippage occurs, in the absence of anything to prevent it, is a function of the load applied to driven member of the coupling. The gearing employed in the new transmission serves to utilize the difference in speed between driving and driven members of the coupling when slippage occurs to reduce the speed of the transmission output, and so to minimize the degree of slippage that occurs when a load is imposed on the transmission output. Further, the gearing can be designed to limit the maximum slippage possible between the driving and driven members of the coupling even when the transmission output is completely stalled.

The gearing by which the foregoing results are achieved is shown in Figs. 1 and 2 as comprising a primary epicyclic gear train 26 and a secondary epicyclic gear train 27. A primary sun gear 28 is secured to the shaft 24 connected to the driven member 22 of the fluid coupling, and a secondary sun gear 29 of the same pitch diameter is secured to the hollow shaft 18 connected to the driving member 11 of the fluid coupling.

A cluster of primary planet gears 30 surrounds and engages with the primary sun gear 28, and a corresponding cluster of secondary planet gears 31 surrounds and engages with the secondary sun gear 29. Each pair of primary and secondary planet gears 30 and 31 is mounted on a common shaft 32. The gears of each pair are free to rotate independently of each other on their own axes, but they are restrained from independent orbital rotation about the sun gears, although of course they may rotate together in their respective orbits about the sun gears.

The common shafts 32 which carry the planet gears are mounted on a spider 33 attached to the output shaft 34 of the transmission. The output shaft is suitably supported in one or more bearings 35 mounted in a frame member 36 attached to the transmission housing 21.

A primary ring gear 37 surrounds and engages the cluster of primary planet gears 30, and a corresponding secondary ring gear 38 surrounds and engages the cluster of secondary planet gears 31. The primary ring gear 37 is mounted on a supporting spider or wheel 39 which is journalled on the output shaft; and the secondary ring gear 38 is mounted on a supporting spider or wheel 40 which is journalled on the hollow shaft 18. Thus each ring gear is freely rotatable so far as its supporting mount is concerned.

As shown in Figs. 1 and 2, the primary ring gear is joined to an external gear 41 and the secondary ring gear is joined to a corresponding external gear 42. These external gears comprise elements of an auxiliary gear drive by which the ring gears are connected together. In Figs. 1 and 2 this auxiliary gear drive comprises a driving gear 43 engaging the external gear 42 of the secondary ring gear. The driving gear is connected by a shaft 44 to a driven gear 45 which in turn is connected through a pair of idler gears 46 and 47 in driving relation with the external ring gear 41 of the primary epicyclic. Through this auxiliary gear drive, any rotation imparted to the ring gear 42 of the secondary epicyclic gear train causes the ring gear 41 of the primary epicyclic gear train to rotate in the same direction but at a lesser speed. The sizes of the idler gears 46 and 47 are chosen to make this speed reduction of whatever value is desired. Of course, instead of using the idler gears 46 and 47, the external gear 41 could be larger than the external gear 42, and could be in direct engagement with the driven gear 45 on the shaft 44 (in which case the driven gear 45 would be smaller than the driving gear 43).

Operation of the transmission described above is as follows: Assuming no load on the output shaft, and with the driving and driven members 11 and 22 respectively of the fluid coupling rotating at the same speed, the sun gears 29 and 28 will be rotating both in the same direction and at the same speed. It is evident that under this condition the planet gears cannot be stationary in their orbital path of rotation about the sun gears, for then the ring gears would have to rotate both at the same speed, and this they are prevented from doing by the auxiliary drive (which requires that they rotate at different speeds if they rotate at all). The only condition under which there can be no speed difference between the ring gears is when they are stationary; hence with the sun gears both rotating at the same speed (the no-load condition here assumed), the ring gears remain stationary and the planet gears all rotate orbitally about the sun gears at their maximum speed. Thus the output shaft rotates in the same direction as, but at some lesser speed than, the sun gears. The reduced speed of rotation of the output shaft, as compared with the sun gears, is due to the inherent reduction gear ratio of the epicyclic gear train, and under no-load conditions is determined entirely by that gear ratio.

Assume now that a load is applied to the output shaft, reducing its speed, while the speed of the engine, and hence of the sun gear 29 connected to the driving member of the fluid coupling, remains constant. This condition will require rotation of the secondary ring gear 38 in the direction opposite to the secondary sun gear. Such rotation, because of the auxiliary drive through gears 43 and 45, brings about rotation of the primary ring gear 37 in the same direction but at a reduced speed. Therefore the primary sun gear 28 must rotate in the same direction as but at a lesser speed than the secondary sun gear 29. (This difference in speed of rotation of the primary and secondary sun and ring gears is permitted by virtue of the fact that the planet gears 30 and 31 rotate freely and independently of each other on their axes.) This condition necessitates slippage between the driving and driven elements 11 and 22 of the fluid coupling. Thus, whenever a load is applied to the output shaft 34, slippage occurs in the fluid coupling, the degree of slippage being dependent on the magnitude of the load. The converse, of course, is equally true: when slippage occurs in the fluid coupling, the speed of rotation of the output shaft is reduced by an amount dependent on the degree of slippage.

If the output shaft 34 is completely stalled, while the engine continues to drive the secondary sun gear 29 at engine speed through the driving member 11 of the fluid coupling, it is clear that the planet gears 30 and 31 are stationary so far as any orbital rotation about the sun gears is concerned. Under this condition they function simply as pinions in a gear train that includes the secondary ring gear 38, the auxiliary drive gears 43, 45, 46 and 47, and the primary ring gear 37 to drive the primary sun gear 28 at a reduced speed determined entirely by the overall gear ratio of the auxiliary drive (i. e. the gears 43, 45, 46 and 47, assuming the corresponding gears in the two epicyclic trains to be of the same size). It is to be noted that although the speed of rotation of the primary ring gear 37 is less than that of the secondary ring gear 38, it is nonetheless rotating at its highest speed when the output shaft is completely stalled, for then the secondary ring gear is rotating at its highest speed. Even under this condition, therefore, the primary sun gear 28 is rotating in the same direction as the secondary sun gear 29, and in consequence the driven element 22 of the fluid coupling is not stalled. In this manner, by suitably selecting the gear ratio of the auxiliary drive, the maximum degree of slippage that can occur in the fluid coupling, even under conditions of a complete stall of the transmission output shaft 34, can be limited very substantially.

Figure 3:
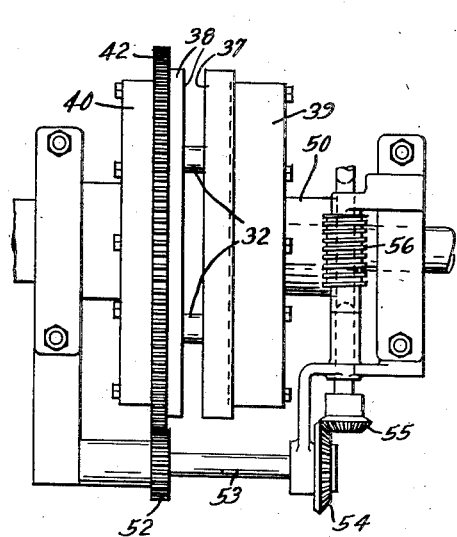
Figs. 3 and 4 are plan and perspective views, respectively, of a modification of the new power transmission.
Figure 4:
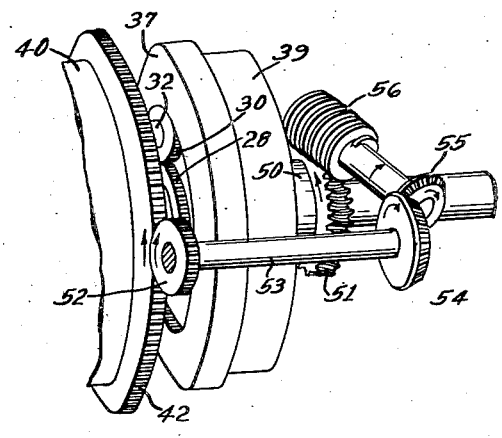

Figs. 3 and 4 show a modification of the transmission mechanism described above, in which a worm and worm gear are employed in the auxiliary drive to prevent any possibility of a feedback of motion from the primary to the secondary epicyclic ring gear. In this modification, only the secondary ring gear 38 is provided with the external gear 42. The spider or wheel 39 which carries the primary ring gear 37 is formed with a hub 50 of sufficient length to carry a worm gear 51. The auxiliary drive here comprises a driving gear 52 engaging the external gear 42 of the secondary ring gear. The driving gear 52 is connected through an auxiliary drive shaft 53 and through a pair of bevel gears 54 and 55 to a worm 56 which engages the worm gear 51 in driving relation with the primary ring gear 37. As in the modification previously described, the gear ratios between the external gear 42 and the driving gear 52, between the engaging bevel gears 54 and 55, and between the worm 56 and worm gear 51, are selected so that any rotation of the secondary ring gear 38 results in rotation in the same direction but at a somewhat lesser speed of the primary ring gear 37. In general, therefore, the purpose and mode of operation of the modified auxiliary drive shown in Figs. 3 and 4 is the same as in the case of that described above with reference to Figs. 1 and 2.

In some uses for the new transmission mechanism, notably when it is used for the transmission of power from the engine to the driving wheels of a motor vehicle, it is desirable to take advantage of the variable output speed characteristics of the transmission mechanism when power is applied to the driving member of the fluid coupling and thereby drives the output shaft, but to effect a direct and positive mechanical connection of the output shaft to the driving element of the fluid coupling when the power is applied first to the output shaft and is transmitted back to the fluid coupling. A modification of the transmission mechanism for accomplishing this result is shown in Figs. 5 and 6. In this modification a unidirectional coupling 60 is interposed between the primary sun gear 28 secured to the shaft 24 of the driven element of the fluid coupling and the secondary sun gear 29 secured to the hollow shaft 18 of the driving element of the fluid coupling.

The unidirectional coupling 60 is essentially a conventional overrunning clutch. It comprises a driving member 61 secured to the shaft 24 between the two sun gears. This driving member is in the form of a hardened internal ball race, about the periphery of which are a plurality of substantially equally spaced hardened balls 62. A driven member 63 secured to the secondary sun gear 29 (or alternatively directly to the hollow shaft 18) completes the unidirectional coupling. The inner periphery of this driven member is formed to define a series of involute cam faces 64 equal in number to the number of balls 62.

Assuming that the members 61 and 63 normally rotate counterclockwise as viewed in Fig. 6, then so long as power is being transmitted by the fluid coupling to both of the sun gears 28 and 29 (and hence also to the driving and driven members 61 and 63 of the unidirectional coupling), enough slippage will always occur in the fluid coupling to cause the driving member 61 to rotate a trifle faster than the driven member 63 and cause the balls to ride to the deep portions of the cam faces 64 where they are ineffective for preventing relative rotation between the driving and driven elements of the unidirectional coupling. If, on the other hand, the power is released from the fluid coupling and is applied backwards through the primary sun gear 28, the driving member 61 will tend to rotate counterclockwise at a higher speed than the driven member 63. As a result the balls 62 will become wedged between these two members, locking them together. Thereby a direct and positive mechanical connection is formed between the driving and driven members of the fluid coupling, and the variable speed characteristics of the new transmission are locked out. This feature in an automobile transmission means that when the vehicle is being propelled by its engine, the full advantages of the variable speed characteristics of the new transmission are available; but when the vehicle is coasting the full braking effect of the engine compression can be utilized.

I claim:

1. A power transmission mechanism comprising a slippable coupling having driving and driven members, an output shaft, first and second epicyclic gear trains each comprising a sun gear, a planet gear, and a ring gear, the sun gear of said first epicyclic train being connected to said driven member and the sun gear of said second epicyclic train being connected to said driving member, and the planet gears of both of said epicyclic trains being connected to the output shaft and being restrained from independent orbital rotation about their respective sun gears while being free to rotate independently about their respective axes, and gear means separate from said planet gears interconnecting the ring gears of said epicyclic trains and causing relative rotation of said ring gears whenever there is relative rotation of the sun gears.

2. A power transmission mechanism comprising a slippable coupling having driving and driven members, an output shaft, first and second epicyclic sun gear elements secured respectively to said driven and driving members, epicyclic planet gear elements secured to said output shaft and engaging said first and second elements, and gear means interconnecting said first and second sun gear elements through said planet gear elements and limiting the extent of relative rotation that may occur between said driving and driven members.

3. A power transmission mechanism comprising a slippable coupling having driving and driven members, an output shaft, a primary epicyclic gear train having a sun gear and a planet gear, one of said gears being attached to the output shaft and the other thereof being attached to said driven member, and a ring gear completing said primary epicyclic train, said driving member being gear-connected to and serving to drive said ring gear whenever relative rotation occurs between said driving and driven members, said gearing thereby serving to interconnect the driving and driven members and to limit the extent of slippage that can occur therebetween.

4. A power transmission mechanism comprising a slippable coupling having driving and driven members, an output shaft, a primary epicyclic gear train having engaged sun and planet gears one of which is connected to said driven member and the other of which is connected to said output shaft, whereby relative rotation between said output shaft and said driven member may occur through orbital rotation of said planet gear about the sun gear, and a ring gear engaging said planet gear and gear connected to said driving element, whereby the degree of relative rotation between said driving and driven members that can occur is limited.

5. A power transmission mechanism comprising a slippable coupling having driving and driven members, an output shaft, a primary epicyclic gear train comprising engaged sun and planet gears one of which is connected to said driven member and the other of which is connected to said output shaft, a ring gear engaging said planet gear, and means for counterrotating said ring gear relative to said sun gear at a speed determined by the degree of slippage between said driving and driven members comprising a secondary epicyclic gear train directly connected to said driving member and connected through an auxiliary gear train to the ring gear of said primary epicyclic train.

6. A power transmission mechanism comprising a slippable coupling having driving and driven members, an output shaft, and means connecting the output shaft to the coupling comprising an epicyclic gear train having a sun gear and a planet gear one of which gears constitutes a driving gear connected to said driven member of the coupling, and the other of which gears constitutes a driven gear engaging said driving gear and connected to the output shaft, said epicyclic gear train further having a ring gear which is gear-connected to and driven from said driving member and engaging said planet gear.

7. A power transmission mechanism comprising a slippable coupling having driving and driven members, an output shaft, and means for driving the output shaft at a speed determined by the loading thereon comprising primary and secondary epicyclic gear trains each having a sun gear, a planet gear, and a ring gear, said sun gears being connected respectively to the driven and driving members of the coupling, said planet gears being both connected to the output shaft and being restrained from independent orbital rotation about their respective sun gears, and an auxiliary gear drive connecting said ring gears together, the gears of said auxiliary drive having ratios such as to prevent rotation of the ring gears simultaneously at the same velocity.

8. A power transmission mechanism comprising a slippable coupling having driving and driven members, an output shaft, a planet gear carrier secured to the output shaft, and means for driving the output shaft at a speed determined by the loading thereon comprising primary and secondary sun gears connected respectively to the driven and driving members of the coupling, primary and secondary planet gears respectively engaging said sun gears and rotatably mounted on a common shaft by which they are restrained from independent orbital motion about their respective sun gears, said common shaft being mounted on the planet carrier secured to the output shaft, primary and secondary ring gears respectively engaging said planet gears, and an auxiliary gear drive including a driving gear driven by said secondary ring gear and a driven gear connected in driving relation with said primary ring gear, the gears of said auxiliary drive having ratios such that rotation of the secondary ring gear causes rotation of the primary ring gear in the same direction but at a slower speed.

9. A power transmission mechanism comprising a slippable coupling having driving and driven members, an output shaft, a planet carrier secured to said shaft, primary and secondary sun gears connected respectively to said driven and driving members, primary and secondary planet gears respectively engaging said sun gears and rotatably mounted on a common shaft secured to said planet carrier, primary and secondary ring gears respectively engaging said planet gears, and an auxiliary gear drive comprising a driving gear driven by said secondary ring gear and a worm driven by said driving gear and engaging a worm gear secured to said primary ring gear, whereby rotation of the secondary ring gear causes rotation of the primary ring gear.

10. A power transmission mechanism comprising a slippable coupling having driving and driven members, a primary sun gear secured to said driven member, a secondary sun gear secured to said driving member, primary and secondary planet gears respectively engaging said primary and secondary sun gears, an output shaft having a planet carrier on which said planet gears are mounted for independent axial rotation but by which they are restrained against independent orbital rotation about the sun gears, primary and secondary ring gears respectively engaging said primary and secondary planet gears, and an auxiliary gear drive interconnecting said ring gears.

11. A power transmission mechanism comprising a slippable coupling having driving and driven members, a primary sun gear secured to said driven member, a secondary sun gear secured to said driving member, primary and secondary planet gears respectively engaging said primary and secondary sun gears, an output shaft having a planet carrier on which said planet gears are rotatably mounted and by which they are restrained against independent orbital rotation about the sun gears, primary and secondary ring gears respectively engaging said primary and secondary planet gears, auxiliary gear means interconnecting said ring gears, and a unidirectional coupling having a driving element secured to said primary sun gear and a driven element secured to said secondary sun gear, whereby rotation of the primary sun gear relative to the secondary sun gear may occur in one direction only throughout a range of speeds.

12. In a power transmission mechanism comprising a slippable coupling having driving and driven members, an output shaft. and primary and secondary epicyclic gear trains having driving gears connected respectively to said driven and driving members and having driven gears connected to said output shaft, the improvement comprising a unidirectional coupling having a driven element secured to the driving gear of said secondary epicyclic train and a driving element secured to the driving gear of said primary epicyclic train.

ERNEST KLEPETKO, Jr.

References Cited in the file of this patent

UNITED STATES PATENTS

| Number | Name | Date |
|---|---|---|
| 805,172 | Waldron | Nov. 21, 1905 |
| 1,764,849 | O'Connor | June 17, 1930 |
| 2,196,585 | Gette | Apr. 9, 1940 |
| 2,238,748 | Patterson | Apr. 15, 1941 |
| 2,551,396 | Roosevelt | May 1, 1951 |